May 2, 1933. W. C. NICHOLS 1,906,235
TRAFFIC CONTROLLING SIGNAL FOR SCHOOLS AND THE LIKE
Filed Dec. 6, 1930 3 Sheets-Sheet 2
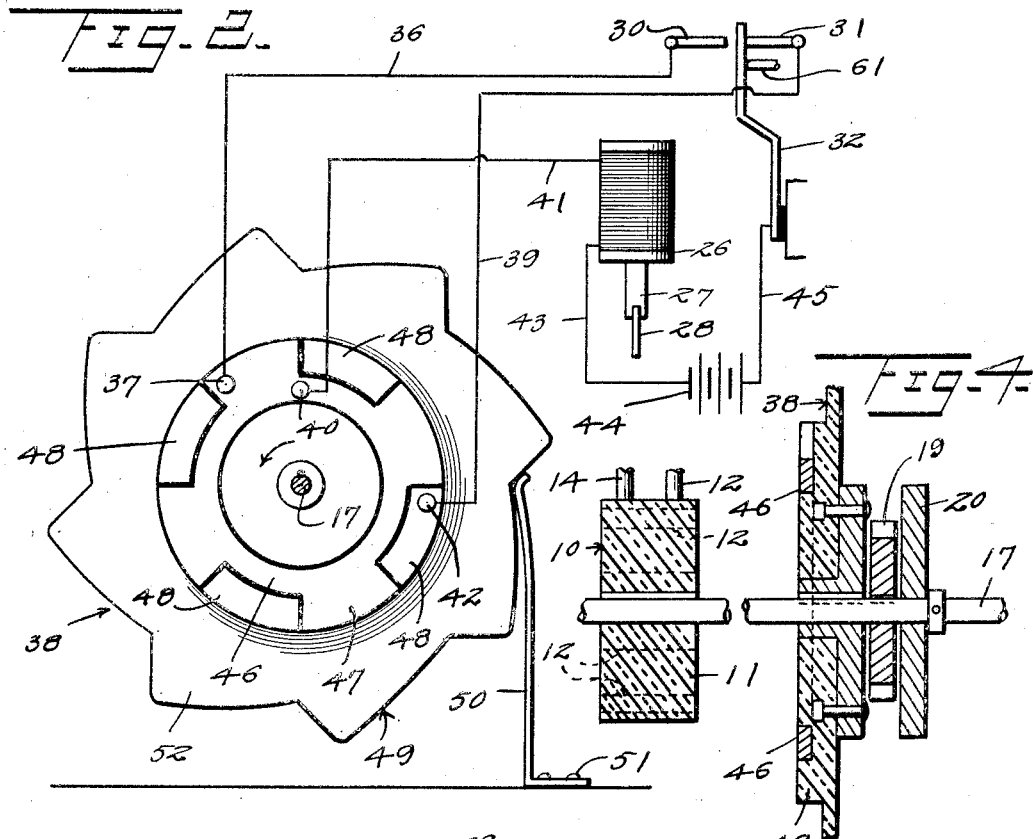
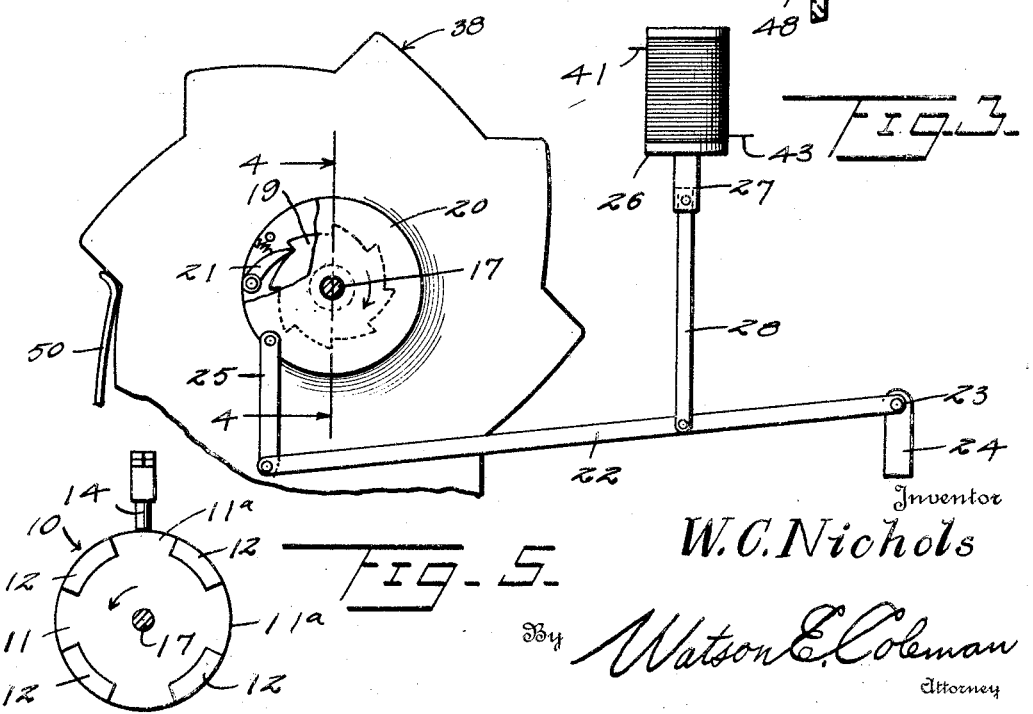
Inventor
W. C. Nichols
By Watson E. Coleman
Attorney May 2, 1933.  W. C. NICHOLS  1,906,235
TRAFFIC CONTROLLING SIGNAL FOR SCHOOLS AND THE LIKE
Filed Dec. 6, 1930  3 Sheets-Sheet 3
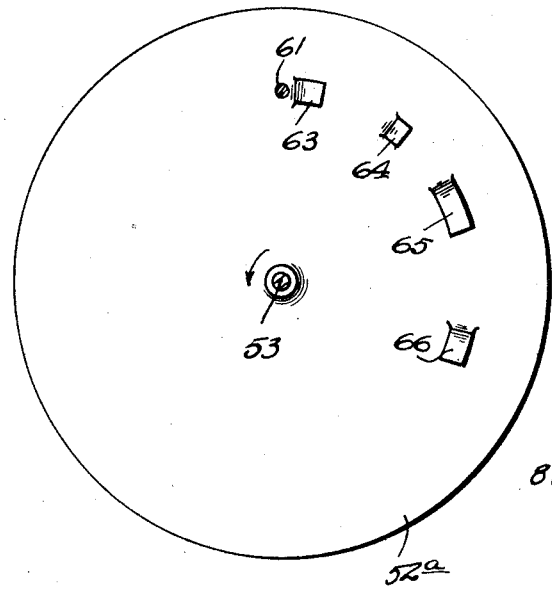
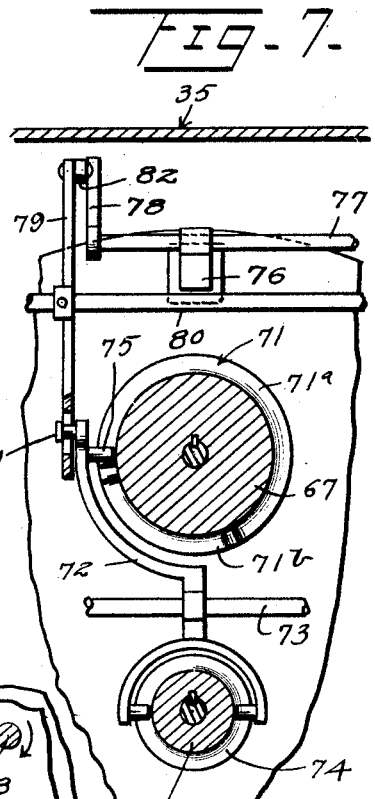
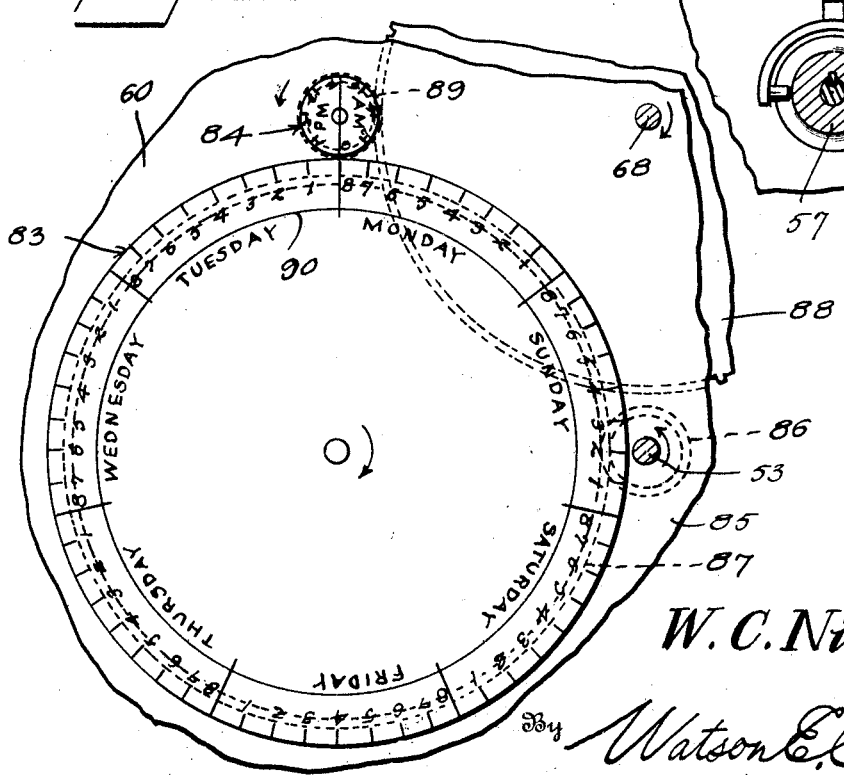
Inventor
W. C. Nichols
By Watson E. Coleman
Attorney Patented May 2, 1933

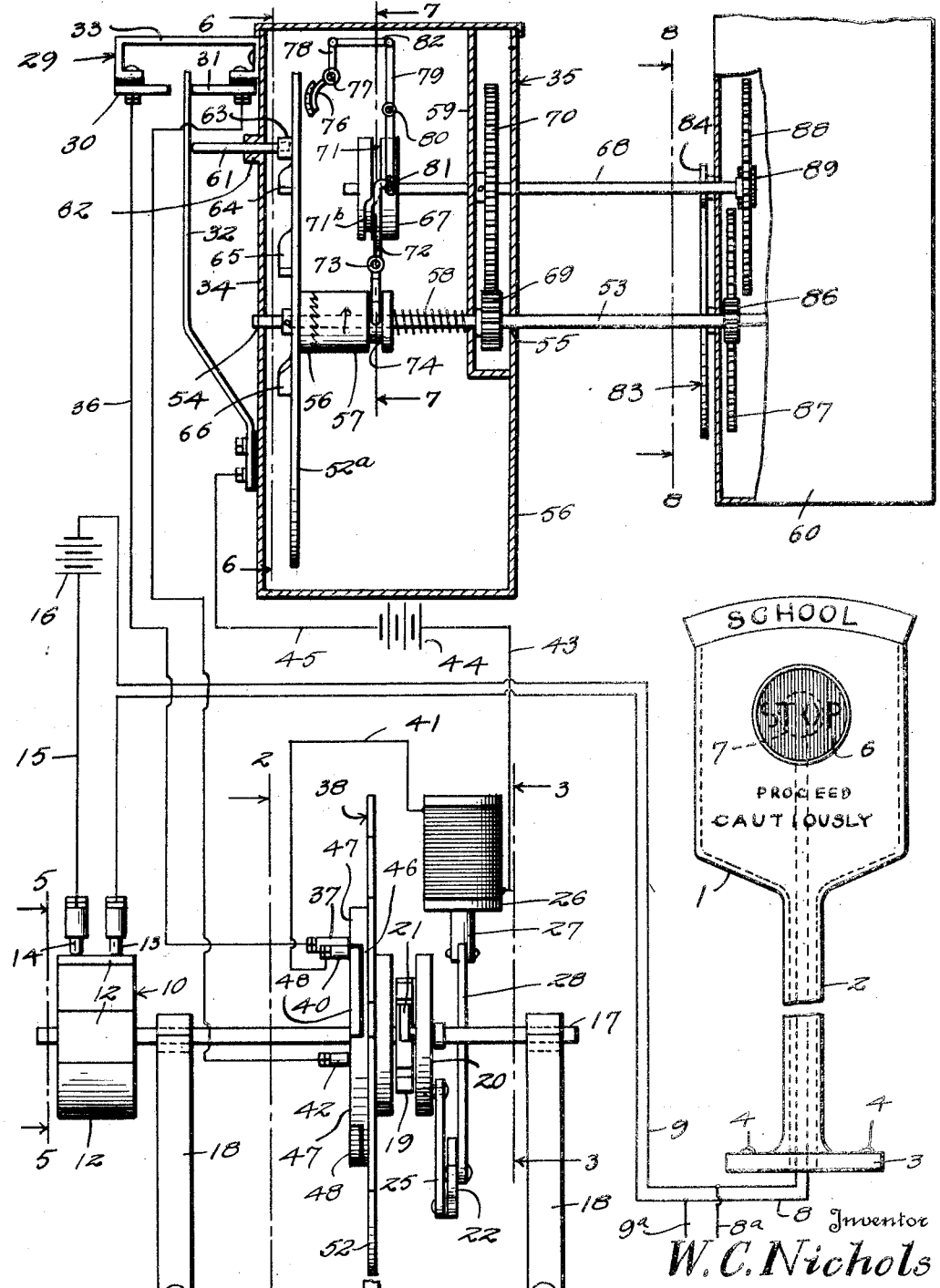

1,906,235

UNITED STATES PATENT OFFICE

WILBUR C. NICHOLS, OF BEATRICE, NEBRASKA

TRAFFIC CONTROLLING SIGNAL FOR SCHOOLS AND THE LIKE

Application filed December 6, 1930. Serial No. 500,647.

This invention relates to signals for controlling automobile and other vehicular traffic, and has for one of its objects to provide a signal of the character stated which shall be especially adapted to be used for the purpose of providing a safety zone in front of a school by preventing automobiles and other vehicles from entering that section of the street on which the school faces.

The invention has for a further object to provide a signal of the character stated which shall be adapted to operate automatically only during school days and then only for a predetermined period of time before the school opens, during the morning and noon recesses of the school, and for a predetermined period of time after the school closes.

The invention has for a further object to provide a signal of the character stated which shall be simple, durable and highly efficient, and which may be manufactured, installed and operated at a comparatively low cost.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view partly diagrammatic illustrating the signal.

Figure 2 is a sectional view taken on the vertical plane indicated by the line 2—2 of Figure 1.

Figure 3 is a sectional view taken on the vertical plane indicated by the line 3—3 of Figure 1.

Figure 4 is a sectional view taken on the vertical plane indicated by the line 4—4 of Figure 3.

Figure 5 is a sectional view taken on the vertical plane indicated by the line 5—5 of Figure 1.

Figure 6 is a sectional view taken on the vertical plane indicated by the line 6—6 of Figure 1.

Figure 7 is a sectional view taken on the vertical plane indicated by the line 7—7 of Figure 1, and Figure 8 is a sectional view taken on the vertical plane indicated by the line 8—8 of Figure 1.

The signal comprises stop signs adapted to be located in such a manner on the street or streets on which a school faces as to prevent automobiles and other vehicles from passing in front of the school. Each of the stop signs, only one of which is shown in the drawings and designated 1, is of hollow formation, and is mounted upon a hollow standard 2 which has its lower end enlarged to provide a base 3 which is adapted to be secured to the street by anchoring elements 4. The front or that side of the stop sign 1 which faces the traffic is provided with an opening in which is secured a lens 6 which is suitably colored and bears the word "stop". On the face of the sign 1 appears the word "school" and the words "proceed cautiously", the former being located above and the latter below the lens 6.

An electric lamp 7 is located in the sign 1 in a position to illuminate the lens 6, and conductors 8 and 9 for supplying the lamp with current pass through the sign 1, standard 2 and base 3. Conductors 8a and 9a extend from the conductors 8 and 9, respectively, to the other stop sign or stop signs.

A switch 10 for controlling the supply of current to the lamp 7, comprises a rotatable drum 11 which is made of insulating material and in the periphery of which are recessed four conductor segments 12. The conductor segments 12 are arranged in equally spaced relation on and are insulated from each other by the drum 11. The switch 10 also comprises brushes 13 and 14 which are radially related to the drum 11 and which are adapted to contact with one of the conductor segments 12 or with one of the portions 11a of the periphery of the drum located between the conductor segments and constituting insulating segments. The brushes 13 and 14 are normally in engagement with one of the insulating segments 11a. The conductor 8 is connected to the brush 13, and a conductor 15 extends from the brush 14 to a source of electric current which for the purpose of illustration is shown as consisting of a battery 16. The conductor 9 is also connected to the current source 16. When the brushes 13 and 14 contact with one of the conductor segments 12, the switch 10 is in circuit closing position, and when the brushes contact with one of the insulating segments 11a, the switch is in circuit breaking position. When the switch 10 is in circuit closing position, the lamp 7 illuminates the lens 6, and the sign 1 functions to prevent the passage of automobiles and other vehicles in front of the school. When the switch 10 is in circuit breaking position, the lens 6 is not illuminated, and the sign 1 functions to warn the drivers of automobiles and other vehicles to proceed cautiously by the school.

The switch 10 is moved into circuit closing position or into circuit breaking position through the medium of means which comprises a shaft 17 which is rotatably supported by bearing standards 18 and to which the switch drum 11 is fixedly secured. A ratchet wheel 19 is fixedly secured to the shaft 18, and a collar 20, loosely mounted upon the shaft, is provided with a pawl 21 which engages the ratchet wheel. A lever 22 is pivotally connected at one end, as at 23, to a bracket 24, and is connected at its other end by a link 25 to the loose collar 20. A solenoid 26 is supported above the lever 22 by means, not shown, and the core 27 thereof is connected to the lever 22 by a link 28. When the solenoid 26 is energized, the lever 22 is rocked upwardly. As the lever 22 is connected to the shaft 17 through the medium of the ratchet wheel 19, collar 20, pawl 21 and link 25, and as the switch drum 11 is fixed to the shaft, this movement of the lever imparts a one-eighth revolution to the switch drum, with the result that one of the conductor segments 12 is moved into or out of engagement with the brushes 13 and 14. When the solenoid is deenergized, the lever 22 swings downwardly under its own weight, with the result that the pawl 21 is carried into engagement with another tooth of the ratchet wheel 19, so that when the solenoid is again energized, the switch drum will be again moved through a one-eighth turn to carry one of the conductor segments 12 into or out of engagement with the brushes 13 and 14.

The solenoid 26 is under the control of a switch 29 which comprises contacts 30 and 31, and a blade 32. The contacts 30 and 31 are secured to and insulated from a bracket 33 which is secured to the front wall 34 of a casing 35, and they are arranged in opposed relation so as to receive therebetween the upper end of the blade 32. The lower end of the blade 32 is secured to and insulated from the casing wall 34. The blade 32 is resilient, and the upper end thereof is normally in engagement with the contact 31.

The contact 30 is connected by a conductor 36 to a brush 37 of a circuit interrupter 38, the contact 31 is connected by a conductor 39 to the brush 42 of the circuit interrupter, and one terminal of the coil of the solenoid 26 is connected by a conductor 41 to the remaining brush 40 of the circuit interrupter. The other terminal of the coil of the solenoid 26 is connected by a conductor 43 to a source of electric current which may be the same source of current to which the conductors 9 and 15 are connected but which for the purpose of illustration is shown as an independent source and consisting of a battery 44. The blade 32 of the switch 29 is connected to the source of current by a conductor 45. The circuit interrupter 38 also comprises a conductor ring 46 and four conductor segments 47 which extend radially and in equally spaced relation from the periphery of the conductor ring and between which are arranged insulating segments 48.

The conductor ring 46 and the segments 47 and 48 are arranged in surrounding relation to the shaft 17, and are supported therefrom by a ratchet wheel 49 of insulating material and fixedly secured to the shaft. The brush 40 constantly engages the conductor ring 46, the brush 37 is normally engaged with one of the conductor segments 47 and the brush 42 is normally engaged with one of the insulating segments 48, to the end that the solenoid 26 will be energized when the blade 32 is moved into engagement with the contact 30. The energization of the solenoid 26 will result in the drum 11 of the switch 10 being turned through a one-eighth revolution This operation of the drum 11 will carry one of the conductor segments 12 thereof into engagement with the brushes 13 and 14, resulting in the closing of the lamp circuit, and the consequent illuminations of the lens 6 will result in the sign 1 being rendered operative to stop traffic from passing in front of the school.

The conductor ring 46, the conductor segments 47 and the insulating segments 48 rotate in the direction indicated by the arrow of Figure 2, when the drum 11 is rotated to carry one of the conductor segments 12 into engagement with the brushes 13 and 14. Normally, the brush 37 engages one of the conductor segments 47 near the forward end of the latter, and the brush 42 engages one of the insulating segments 48 near the forward end of the latter, and during the operation of the circuit interrupter 38 this conductor segment is moved far enough to carry its rearward end near the brush 37 and another conductor segment is moved far enough to carry its forward end near the brush 42.

It is to be understood that this operation of the circuit interrupter 38 and drum 11 takes place as the result of the movement of the core 27 into the solenoid 26, and that when the core reaches the movement of its inward movement, the operation of the circuit interrupter by the solenoid ceases. The circuit interrupter 38 has, however, a further operation imparted thereto by a spring pawl 50 which has its lower end fixedly secured, as at 51, to the support, not shown, for the bearing standards 18, and which has its free or upper end arranged for engagement with the teeth 52 of the ratchet wheel 49, the teeth of the ratchet wheels 19 and 49 being equal in number, and each ratchet wheel being preferably provided with eight teeth.

When the conductor segment 47 with which the brush 37 engages, has its rearward end arranged close to this brush and when another of the conductor segments has its front end arranged close to the brush 42, the free end of the pawl 50 contacts with the heel of one of the teeth of the ratchet wheel 49. The heels of the teeth 52 and their rearward faces are of such formation that the pawl 52 which is located at the rear side of the ratchet wheel 49 and constantly tends to move in the direction of the center of the ratchet wheel, slides over the heel and rearward face of the tooth engaged thereby, with the result that the ratchet wheel 49 and the conductor segments 47 and insulating segments 48 are moved far enough to carry one of the insulating segments into engagement with the brush 37 and one of the conductor segments into engagement with the brush 42.

This results in the de-energization of the solenoid 26, and the de-energization of the solenoid permits the lever 22 to move downwardly far enough to carry the pawl 21 into engagement with another tooth of the ratchet wheel 19. This also results in the bridging of the brushes 40 and 42, to the end that, when the blade 32 moves into engagement with the contact 31, the solenoid 26 will be again energized to turn the drum 11 one-eighth revolution so as to carry the conductor segment 12 bridging the brushes 13 and 14 out of engagement with such brushes and carry one of the insulating segments 11a into engagement with the brushes. As soon as this occurs the circuit to the lamp 7 is broken and the sign functions to caution the traffic to pass slowly by the school. As soon as the switch 10 is moved into circuit breaking position by the second energization of solenoid 26, the pawl 50 actuates the circuit interrupter 38 to carry the conductor segment 47 engaged by the brush 42 out of engagement with the brush and to carry another of the conductor segments 47 into engagement with the brush 37. The brushes 37 and 40 are now bridged so that when the blade 32 is again moved into engagement with the contact 30, the solenoid 26 will be again energized and move the switch 10 into circuit closing position.

The switch 29 is under the control of means which is adapted to operate it automatically only during school days and in a manner to effect the illumination of the dial 6 for a predetermined period of time before the school opens, for a period of time equal to that of the morning recess, for a period of time equal to that of the noon recess, and for a predetermined period of time after the school closes. This means comprises a disk 52$^a$ of insulating material and is located within the casing 35. The disk 52$^a$ is mounted upon a shaft 53 which is journaled in bearings 54 and 55 carried by the front wall 34 and the rear wall 56 of the casing 35. The disk 52$^a$ is connected to the shaft 53 for rotation by the latter through the medium of a clutch member 56 fixed to the disk and a clutch member 57 splined to the shaft. A spring 58 mounted on the shaft 53 between the clutch member 57 and a bracket 59 located within the casing 35, serves to normally maintain this clutch member in engagement with the clutch member 56. The shaft 53 is driven by a suitable clock 60 at such speed that it will rotate the disk 52$^a$ once every twenty-four hours. As hereinbefore stated, the switch 10 is in normally circuit breaking position, the blade 32 is normally engaged with the contact 31, and the blade must be moved into engagement with the contact 30 to effect the moving of the switch 10 into circuit closing position.

A horizontal plunger 61 is slidably mounted in a bearing 26 carried by the casing wall 34, and has its front end arranged in contact with the blade 32 and its rear end arranged in contact with the disk 52$^a$.

The disk 52$^a$ is provided on the face thereof with an arcuate series of cams 63, 64, 65 and 66, which when the disk is rotated contact with the rear end of the plunger 61 and move it forwardly to effect the movement of the blade 32 from engagement with the contact 31 and into engagement with the contact 30. The cams 63—66 are so positioned upon the disk 52$^a$, are so relatively spaced upon the disk, and are of such lengths that the operation of the blade 32 by the cam 63 will result in the illumination of the stop lens 6 for a predetermined period of time before the school opens, that the operation of the blade with the cam 64 will result in the illumination of the stop lens for a period of time equal to that of the morning recess, that the operation of the blade by the cam 65 will result in the illumination of the stop lens for a period of time equal to that of the noon recess, and that the operation of the blade with the cam 66 will result in the illumination of the stop lens for a predetermined period of time after the school closes. The period during which the stop lens 6 is illuminated depends upon the length of the cams 63—66, and the cams may, of course, be of any desired or required length.

A disk 67 located within the casing 56 above the clutch member 57, is fixed to a shaft 68 which is journaled in the casing wall 56 and bracket 59. The disk 67 is rotated once every seven days from the shaft 53 by means of a pinion 69 fixed to the shaft 53 and a gear 70 fixed to the shaft 68. The disk 67 is provided in its periphery with an endless groove 71 which has relatively offset portions 71a and 71b.

A lever 72 pivotally supported between its ends, as at 73, has a forked lower end engaging in an annular groove 74 formed in the periphery of the clutch member 57. The upper end of the lever 72 is provided with a pin 75 which engages in the grooves 71. The groove portion 71a is equal in length to five-sevenths of the circumference of the disk 67, and the groove portion 71b is equal in length to two-sevenths of such circumference. When the pin 75 is in the groove portion 71a the clutch member 57 is in engagement with the clutch member 56, with the result that a driving connection is established between the disk 52a and its shaft 53. While the pin 75 is passing from the groove portions 71a into the groove portions 71b the clutch member 57 is moved out of engagement with the clutch member 56 against the tension of the spring 58. While the pin 75 is in the groove portion 71b the clutch member 57 is held out of engagement with the clutch member 56. While the pin 75 is passing from the groove portion 71b into the groove portion 71a, the clutch member 57 is moved into engagement with the clutch member 56 by the spring 58. As the disk 67 is rotated once every seven days, as the groove portion 71a is equal in length to five-sevenths of the circumference of the disk, and as the groove portion 71b is equal in length to two-sevenths of the circumference of the disk, it will be understood that the disk 52a will be operated for five days and remain idle for two days. This means for controlling the switch 29 is set to effect the operation of the disk 52a during Monday, Tuesday, Wednesday, Thursday and Friday and to permit the disk to remain idle during Saturday and Sunday.

To hold the disk 52a against accidental movement during the days when it is not being operated, a brake 76 is provided. The brake 76 is pivotally mounted within the casing 35, as at 77. An arm 78 is fixed to the pivot 77, a lever 79 pivoted between its ends, as at 80, and connected, as at 81, to the upper end of the clutch throwing arm 72 and a link 82 connected to the arm and lever 79, provide means for moving the brake 76 into contact with the disk 52a when the clutch throwing lever 76 is operated to disengage the clutch member 57 from the clutch member 56. When the clutch throwing lever 72 releases the clutch member 57, the latter is moved by the spring 58 and in turn withdraws the brake 76 from engagement with the disk 52a.

Dials 83 and 84 are arranged upon the face 85 of the clock 60. The dial 83 is rotated once every seven days and the dial 84 is rotated once every day. The dial 83 is driven from the shaft 53 by a pinion 86 fixed to the shaft and a gear 87 fixed to the dial. The dial 84 is driven from the shaft 68 by a gear 88 fixed to the shaft and a pinion 89 fixed to the dial. The face of the dial 83 is divided into seven divisions 90, and the respective divisions are marked with the days of the week and are divided into eight equal divisions numbered from one to eight. The face of the dial 84 is divided into eight equal divisions, numbered respectively from one to eight, four of these divisions representing a. m. periods of time and the other p. m. periods of time.

The dials 83 and 84 being operatively connected to the clock through the train of gears and the drive shaft 53, will be rotated at all times with the rotation of the drive shaft 53, and when the device hereinbefore described has been initially set or synchronized with the clock, these dials 83 and 84 will show at a glance the position of the switch closing member 52 having the cams 63—66 mounted thereon. In other words, in the event the clock stops, the dials will determine the relative position of the switch closing member so that it can be properly set for the particular day of the week on which the clock is again set in motion. Without the use of these dials 83 and 84, the only way by which the position of the switch closing member could be determined would be by trial or experiment, and as this would require the use of an expert whose services would be an added expense to the operation of the device, the dials 83 and 84 will enable an unskilled person to see at a glance the relative position of the switch closing means, so that the clock can be turned to the point where the correct days are shown on these dials.

It is believed that the drawings and foregoing description illustrate and set forth the construction and operation of the signal sufficiently to render a further explanation unnecessary. While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. Signal controlling apparatus including a switch, means for moving the switch into circuit closing and circuit breaking position and including a solenoid, a circuit for the solenoid, a switch included in said circuit, a clock driven shaft, an actuating member for said second switch, a clutch connecting said member to the shaft, clutch throwing means operable from the shaft, and means for operatively connecting said clutch throwing means with said shaft.

2. Signal controlling apparatus including a switch, means for moving the switch into circuit closing and circuit breaking position and including a solenoid, a circuit for the solenoid, a switch included in said circuit, a clock driven shaft, an actuating member for said second switch, a clutch connecting said member to the shaft, clutch throwing means operable from the shaft, and a brake operable by the clutch throwing means to hold said member against movement when the clutch is thrown.

3. Signal controlling apparatus including a switch, means for moving the switch into circuit closing and circuit breaking position and including a solenoid, a circuit for the solenoid, a switch included in said circuit, a clock driven shaft, an actuating member for said second switch, a clutch connecting said member to the shaft, a disk driven from the shaft and provided with a peripherial groove having relatively offset portions of different lengths, and a clutch throwing lever having an element entering said groove.

4. Signal controlling apparatus including a switch, means for moving the switch into circuit closing and circuit breaking position and including a solenoid, a circuit for the solenoid, a switch included in said circuit, a rotatably mounted disk, means rotating the disk once every twenty-four hours, means associated with the disk and said second switch for operating the switch at different periods every twenty-four hours, and means for disconnecting the disk from its operating means during predetermined periods of time.

5. Signal controlling apparatus including a switch, means for operating the switch and including a solenoid, a circuit interrupter operated by said means and including brushes of which one is connected to the solenoid, switch contacts connected to the other of said brushes, a blade movable between said contacts, the blade and the solenoid being connected to a source of current and the blade being elastic and normally engaging one of said contacts, and clock operating means for moving the blade into engagement with the other of said contacts for predetermined periods of time.

6. Signal controlling apparatus including a switch, means operable to actuate the switch at different periods during a day, a clock driven shaft, means releasably connecting said first means to the shaft, means operable from the shaft for actuating said second means to disconnect said first means from the shaft after said first means has been operated a number of days, and dial means operatively engaged with said shaft to determine the relative position of said switch operating means.

In testimony whereof I hereunto affix my signature.

WILBUR C. NICHOLS.